Sept. 15, 1931.  A. D. SUND  1,823,300
BROOM BUMPER
Filed April 15, 1930

INVENTOR.
Alfred D. Sund
BY Harry Schroeder
ATTORNEY

Patented Sept. 15, 1931

1,823,300

UNITED STATES PATENT OFFICE

ALFRED D. SUND, OF SANTA ROSA, CALIFORNIA

BROOM BUMPER

Application filed April 15, 1930. Serial No. 444,445.

The invention is for a broom bumper.

The object of the invention is to provide a bumper for brooms, brushes, dust mops and similar devices which may be easily and conveniently attached to the handle of a brushing or dusting device and which although cheaply and simply constructed is very effective in operation.

Another object of the invention is to provide a device as outlined which requires no skill in the method of attachment and which prevents the breakage of handles by cushioning the shock which is ordinarily imparted to the handle when cleaning the brush by bumping the handle directly.

Other objects of the invention will be apparent as the description is read on the drawings forming a part of this specification.

The invention consists primarily of a U shaped section of rubber or other resilient material, the legs of which are comparatively thin while the bend portion is of sufficient thickness to provide an effective resilient bumper. A sheet metal reenforcing liner formed in one integral section comprises a clamping member inserted in the resilient member and is flanged about the sides thereof, the clamping member being contracted at the ends and provided with a bolt for drawing the legs together, the contracted legs of the clamping member having extensions from the flange portions encompassing the legs of the resilient member.

Referring to the accompanying drawings.

Similar reference characters are used to indicate similar parts throughout the several views.

Figure 1:
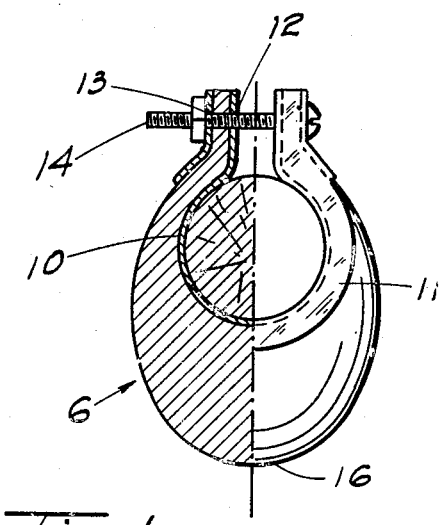
Fig. 1 is an end elevation of the bumper as attached to a handle, one half being indicated in section.
Figure 2:
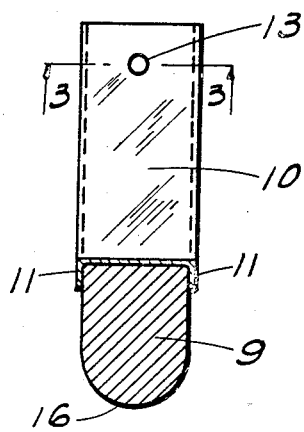
Fig. 2 is a vertical section taken through the invention.
Figure 3:
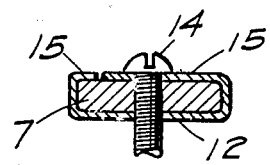
Fig. 3 is a section taken on line 3—3 of Fig. 2.
Figure 4:
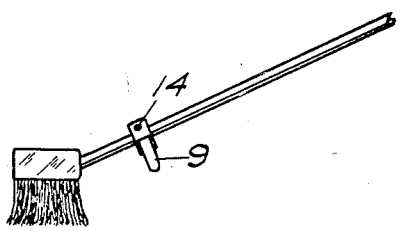
Fig. 4 is a side elevation of a brush with the device attached to the handle.
Figure 5:
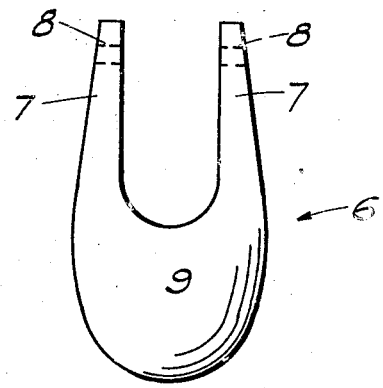
Fig. 5 is an end elevation of the resilient bumper before assembly with the reenforcing sheet metal clamping member.

A bumper 6 of live rubber or other resilient material is provided with two legs 7 having apertures 8 therein and a thickened integral bumper portion 9, the inner and outer surface being of substantially U shape with thickened bend portion.

The reenforcing and clamping member is formed of a single piece of sheet metal, and consists of an arcuately formed collar 10 having radial flanges 11 for retaining the resilient bumper 6 in place, the arcuate section 10 continuing into cooperating ears 12, and the flanges 11 continuing into encompassing reenforcing 15 for the legs 7. The apertures 8 and 13 are adapted to receive the clamping bolt 14.

Installation of the device is accomplished by slipping the collar portion 10 over the handle of a broom and by means of a screw driver, wrench or pliers tightening the clamping bolt 14.

In use, when bumping, the brush is bumped on the bumper surface 16 instead of on the handle as is customarily done.

Having described an operative method of constructing and using the device it will be understood that variations in form may be resorted to which are consistent with the appended claims without detracting from the spirit or scope of the invention or sacrificing any of its advantages, I claim:

1. A bumper for brooms comprising a U shaped resilient bumper member having a substantially thick bend portion, and a unitary sheet metal reenforcing clamping member and cooperating clamping bolt.

2. A bumper for brooms comprising a U shaped resilient bumper member having a substantially thick return bend portion, and a unitary sheet metal reenforcing clamping member, having radial flanges for retaining said bumper member transversely, and a clamping bolt cooperating with the legs thereof.

3. A bumper for brooms comprising a U shaped resilient bumper member having a substantially thick return bend portion, and an interposed unitary sheet metal reenforcing clamping member having radial flanges for retaining said bumper member transversely, and encompassing members for the legs of said resilient bumper, and a cooperating clamp bolt.

4. A bumper for brooms comprising a U shaped resilient bumper member having a substantially thick return bend portion, and, an interposed unitary sheet metal reenforcing and clamping member adapted to fit about a handle and having projecting ears for cooperation with a clamp bolt, radial flanges for retaining said bumper member transversely, said projecting ears having integral portions encompassing the legs of said bumper member, and a bolt cooperating with said ears for clamping said bumper to a handle.

In testimony whereof I affix my signature.

ALFRED D. SUND.